United States Patent
Shieh

(10) Patent No.: US 6,470,906 B1
(45) Date of Patent: Oct. 29, 2002

(54) VALVE HAVING SAFETY STRUCTURE FOR CUTTING OFF HOT WATER

(76) Inventor: Ming Don Shieh, No. 18, Tou Ren Lane, Tou Ren Li, Lu Gang Town, Chang Hua Hsien (TW), 505

( * ) Notice: Subject to any disclaimer, the term of this patent is extended or adjusted under 35 U.S.C. 154(b) by 0 days.

(21) Appl. No.: 09/832,470

(22) Filed: Apr. 12, 2001

(51) Int. Cl.[7] .............................................. G05D 11/03
(52) U.S. Cl. ...................... 137/100; 137/597; 137/876
(58) Field of Search .......................... 137/98, 100, 597, 137/607, 874, 876

(56) References Cited

U.S. PATENT DOCUMENTS 3,448,755 A * 6/1969 Symmons .................. 137/100
5,839,471 A   11/1998 Yang ....................... 137/625.18
6,123,094 A * 9/2000 Breda ......................... 137/597

* cited by examiner

Primary Examiner—Stephen M. Hepperle
(74) Attorney, Agent, or Firm—Charles E. Baxley

(57) ABSTRACT

A valve device includes a cold water inlet and a hot water inlet communicating with a chamber, and one or more ports, a valve housing received in the chamber of the valve device and having a channel for receiving a safety valve. A valve element is engaged in the valve housing for controlling the flowing of the hot water and the cold water through either of the ports. The safety valve may be used for shutting off the hot water when the cold water is shut off inadvertently, so as to prevent the users from being hurt by the hot water inadvertently.

10 Claims, 2 Drawing Sheets

VALVE HAVING SAFETY STRUCTURE FOR CUTTING OFF HOT WATER

BACKGROUND OF THE INVENTION

1. Field of the Invention

The present invention relates to a valve, and more particularly to a valve having a safety structure or a safety mechanism for automatically cutting off or shutting off the hot water when the cold water is cut off and for preventing the users from being hurt by the hot water inadvertently.

2. Description of the Prior Art

Typical valves or faucets are coupled to the cold water and the hot water reservoirs respectively for receiving the cold water and the hot water therefrom and for allowing the cold water and the hot water to be mixed within the valves or the faucets before flowing out of the valves or the faucets.

In order to solve the problems, U.S. Pat. No. 5,839,471 to Yang discloses a safety valve provided for automatically cutting off or shutting off the hot water when the cold water is cut off and for preventing the users from being hurt by the hot water inadvertently. However, the safety valve is separated from the faucet and is required to be attached to or coupled to the faucet before the safety valve may be used or operated. However, it will be difficult for the users to introduce or to couple the safety valve to the faucets. Experts or skillful persons are required to couple the safety valve to the faucets.

The present invention has arisen to mitigate and/or obviate the afore-described disadvantages of the conventional valves or faucets.

SUMMARY OF THE INVENTION

The primary objective of the present invention is to provide a valve including a safety structure or a safety mechanism for automatically cutting off or shutting off the hot water when the cold water is cut off and for preventing the users from being hurt by the hot water inadvertently.

In accordance with one aspect of the invention, there is provided a valve comprising a body including a chamber formed therein, and including two inlets formed therein and communicating with the chamber for receiving hot water and cold water into the chamber thereof, the body including a first port and a second port provided therein, a valve housing received in the chamber of the body and including a channel formed therein and communicating with the inlets of the body for receiving the hot water and the cold water therefrom, a valve means for controlling the flowing of the hot water and the cold water through either of the first port or the second port of the body, and a safety valve means received in the channel of the valve housing for shutting off the hot water when the cold water is shut off and for preventing the hot water from hurting the users inadvertently.

The valve housing includes a space and two passages communicating with the channel and the space of the valve housing. The valve body has two orifices formed in a partition, the valve housing has two hubs engaged into the orifices of the valve body and communicating with the passages of the valve housing.

The valve housing includes an outer peripheral portion having two peripheral recesses formed therein and communicating with the first and the second ports of the body, and includes two passageways formed therein and communicating with the peripheral recesses and the space of the valve housing respectively.

The valve means includes a valve element rotatably received in the space of the valve housing and having a pad for selectively blocking either of the passageways of the valve housing.

A spring biasing device may further be provided for biasing the pad to engage with the valve housing and to block either of the passageways of the valve housing. A device may further be provided for limiting a rotational movement of the valve element relative to the valve housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
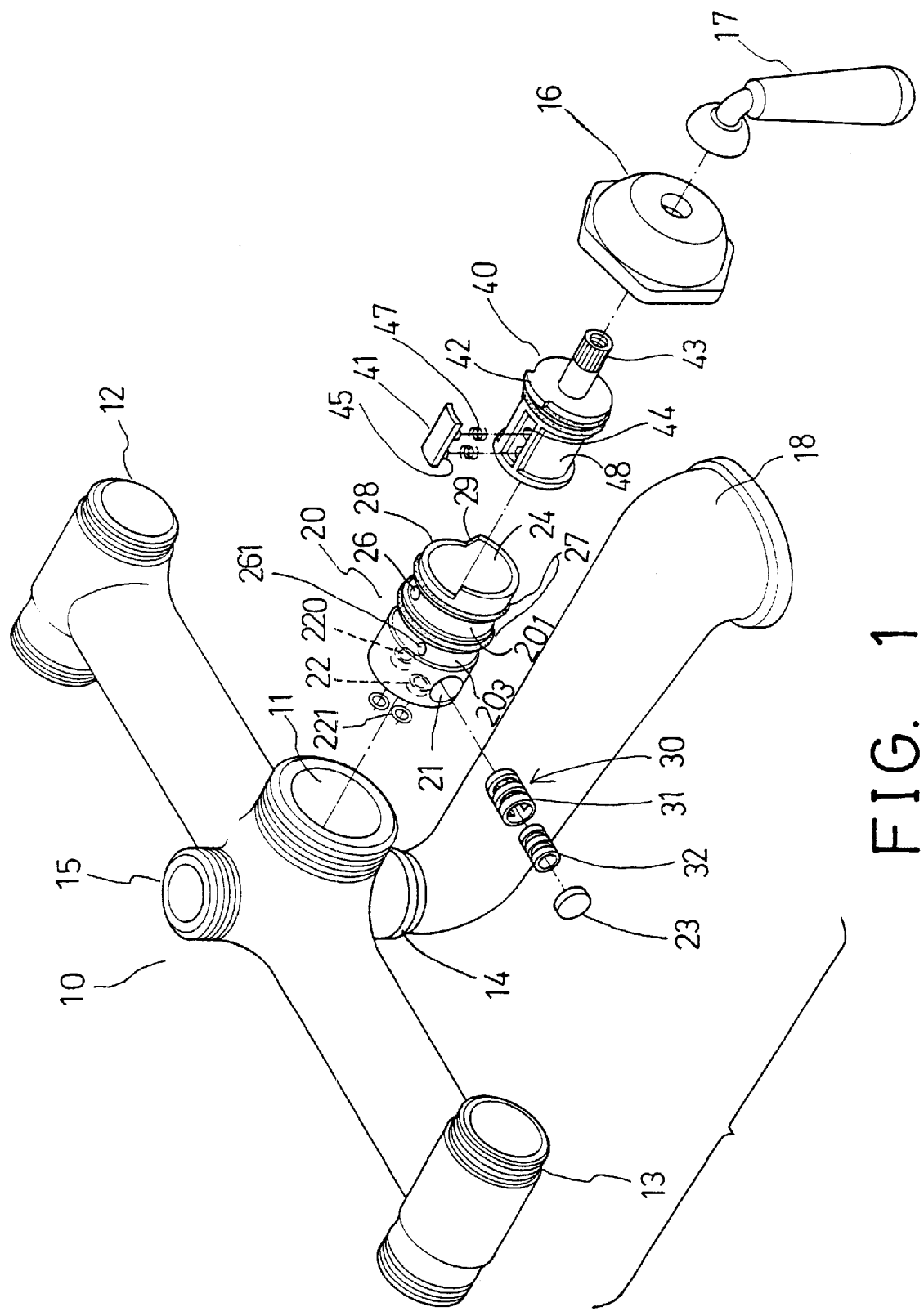
FIG. 1 is an exploded view of a valve in accordance with the present invention.

Referring to the drawings, a valve in accordance with the present invention comprises a valve body or a faucet body 10 including a chamber 11 formed therein and including two inlets 12, 13 formed therein for coupling to the cold water and the hot water reservoirs respectively and for receiving the cold water and the hot water therefrom and for allowing the cold water and the hot water to be mixed within the chamber 11 of the body 10 before flowing out of the body 10. The body 10 includes a partition 101 provided in the inner portion thereof (FIG. 2) and having two orifices 102 formed therein for communicating the inlets 12, 13 with the chamber 11 of the body 10 respectively. The body 10 includes a lower port 14 and an upper port 15 for coupling to a faucet member 18 and a shower head respectively, and includes two valve openings 141, 151 (FIG. 3) formed therein for communicating the ports 14, 15 with the chamber 11 of the body 10.

A valve housing 20 is received in the chamber 11 of the body 10, and includes a lateral channel 21 formed therein, and includes a space 24 formed therein, and includes two passages 25, 251 formed therein and communicating with the lateral channel 21 and the space 24 thereof, and includes two hubs 22, 220 extended therefrom and communicating with the passages 25, 251 respectively and engaged into the orifices 102 of the body 10, for allowing the cold water and the hot water from the inlets 12, 13 to flow into the lateral channel 21 and the space 24 of the valve housing 20, and for preventing the valve housing 20 from rotating relative to the body 10. Two sealing rings 221 are engaged between the hubs 22, 220 and the partition 101 of the body 10 for making a water tight seal therebetween. The valve housing 20 includes two annular or peripheral recesses 201, 203 formed in the outer peripheral portion thereof and includes two passageways 26, 261 formed therein for communicating the space 24 with the peripheral recesses 201, 203 thereof respectively.

Either or both of the cold water and the hot water from the inlets 12, 13 may flow into the space 24 and the lateral channel 21 of the valve housing 20 via the passages 25, 251 of the valve housing 20, and may thus flow into the ports 14, 15 via the passageways 26, 261 and the peripheral recesses 201, 203 of the valve housing 20. The cold water and/or the hot water from the inlets 12, 13 may thus flow out through the faucet member 18 or the shower head via the peripheral recesses 201, 203 of the valve housing 20 respectively. One or more sealing rings 27 may be engaged onto the outer peripheral portion of the valve housing 20 for making a water tight seal between the valve housing 20 and the body 10 and for preventing the water from flowing between the peripheral recesses 201, 203 of the valve housing 20.

The valve housing 20 includes a notch 28 formed in the outer end thereof and defined by or formed or defined between two shoulders or stops 29. A valve element 40 is rotatably received in the space 24 of the valve housing 20 and includes a protrusion 42 extended radially outward therefrom for engaging in the notch 28 of the valve housing 20 and for limiting the rotational movement of the valve element 40 relative to the valve housing 20. The valve element 40 includes one or more cavities 44 formed therein. A block member or a pad 41 includes one or more legs 45 extended therefrom and slidably engaged into the cavities 44 of the valve element 40. One or more springs 47 are engaged on the legs 45 and biased between the valve element 40 and the pad 41 for biasing the pad 41 to engage with the valve housing 20 and to block either of the passageways 26, 261 of the valve housing 20. The valve element 40 may include a peripheral recess 48 and/or one or more passages formed therein, particularly formed in the outer peripheral portion thereof for allowing the water from the lateral channel 21 or the passages 25, 251 of the valve housing 20 to flow through the space 24 and the passageways 26, 261 of the valve housing 20.

A handle 17 may be coupled to an extension 23 of the valve element 40 in order to rotate the valve element 40 and to block either of the passageways 26, 261 of the valve housing 20 by the pad 41. A cover 16 may be threaded to the body 10 for retaining the valve element 40 and the valve housing 20 within the body 10. It is to be noted that the engagement of the protrusion 42 of the valve element 40 with the stops 29 of the valve housing 20 may be used to determine or to maintain the blocking of the pad 41 with either of the passageways 26, 261 of the valve housing 20. For example, when the protrusion 42 of the valve element 40 is engaged with one of the stops 29 of the valve housing 20, the pad 41 may be used to block one of the passageways 26, 261 of the valve housing 20. When the protrusion 42 of the valve element 40 is engaged with the other stop 29 of the valve housing 20, the pad 41 may be used to block the other passageway 26, 261 of the valve housing 20, such that the water may be controlled to flow out through either of the ports 14, 15 or either of the faucet element 18 or the shower head by the valve element 40.

A safety valve 30 includes an outer valve member 31 slidably received in the lateral channel 21 of the valve housing 20, and an inner valve member 32 slidably received in the outer valve member 31, and a cap 23 may be secured to the valve housing 20 for blocking and retaining the valve members 31, 32 within the valve housing 20. When both the cold water and the hot water flow into the safety valve 30 via the passages 25, 251 of the valve housing 20, the valve members 31, 32 may be used to block and to shut off the hot water when the cold water is cut off or shut off inadvertently, in order to prevent the users from being hurt by the hot water inadvertently. The operation of the valve members 31, 32 of the safety valve 30 has been disclosed in U.S. Pat. No. 5,839,471 to Yang, which is taken as a reference for the present invention.

Figure 2:
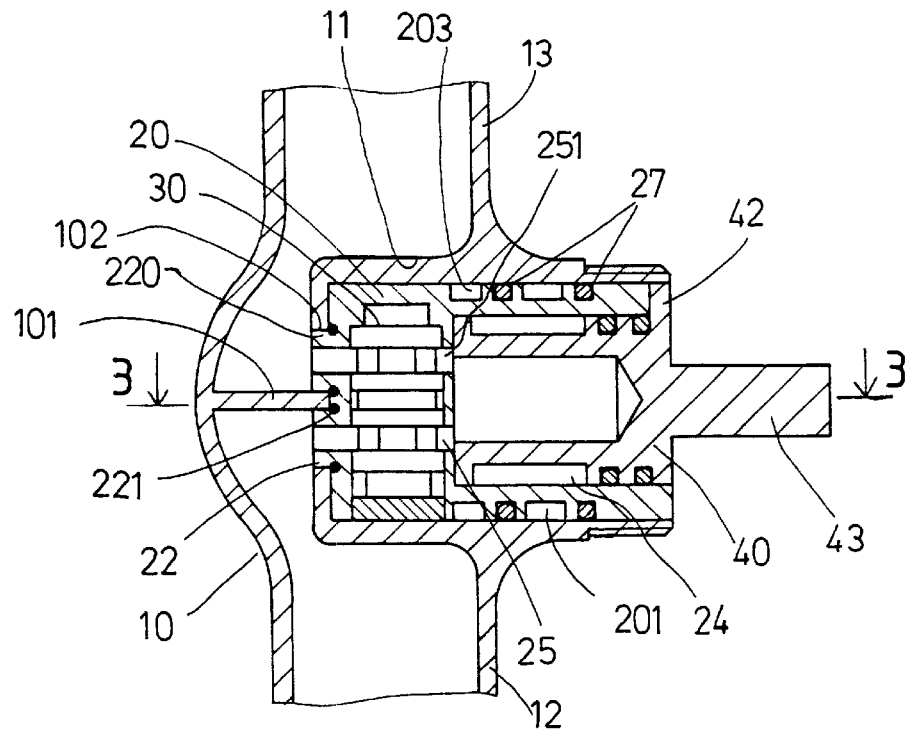
FIG. 2 is a cross sectional view taken along lines 2—2 of FIG. 3.
Figure 3:
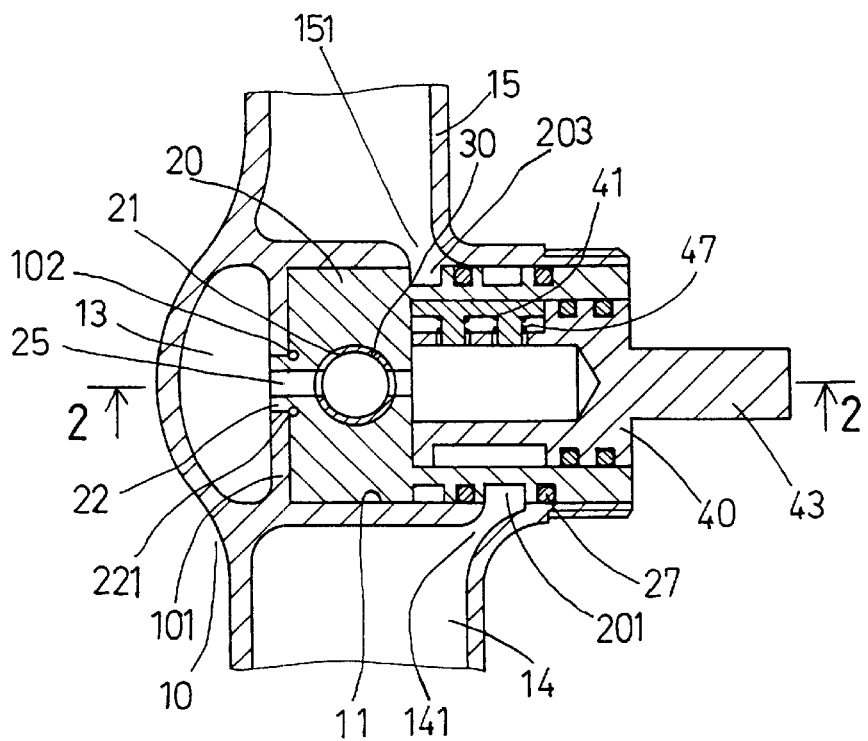
FIG. 3 is a cross sectional view taken along lines 3—3 of FIG. 2.

In operation, as shown in FIGS. 2, 3, either or both of the cold water and the hot water from the inlets 12, 13 may flow into the space 24 and the lateral channel 21 of the valve housing 20 via the passages 25, 251 of the valve housing 20, and may thus flow out of either of the faucet member 18 or the shower head via the ports 14, 15 and the passageways 26, 261 and the peripheral recesses 201, 203 of the valve housing 20. The valve element 40 may be used to control the cold water and/or the hot water to flow out through either of the passageways 26, 261 of the valve housing 20 by blocking either of the passageways 26, 261 of the valve housing 20 with the pad 41. The safety valve 30 may be used to shut off the hot water when the cold water is shut off inadvertently, in order to prevent the users from being hurt by the hot water inadvertently.

It is to be noted that the users may obtain a faucet having a valve element 40 for controlling the outward flowing of the water through either of the faucet member 18 or the shower head. The safety valve 30 may be used to shut off the hot water when the cold water is shut off inadvertently. The users are not required to attach or to couple an additional or a separate safety valve to the typical faucet.

Accordingly, the valve in accordance with the present invention includes a safety structure or a safety mechanism for automatically cutting off or shutting off the hot water when the cold water is cut off and for preventing the users from being hurt by the hot water inadvertently.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A valve comprising:
a body including a chamber formed therein, and including two inlets formed therein and communicating with said chamber for receiving hot water and cold water into said chamber thereof, said body including at least one port provided therein, said valve body including a partition provided therein and having two orifices formed therein,
a valve housing received in said chamber of said body and including a channel formed therein and communicating with said inlets of said body for receiving the hot water and the cold water therefrom, said valve housing including a space formed therein and including two passages formed therein and communicating with said channel and said space of said valve housing, said valve housing including two hubs extended therefrom and engaged into said orifices of said valve body and communicating with said passages of said valve housing,
a valve means for controlling the flowing of the hot water and the cold water through said at least one port of said body, and
a safety valve means received in said channel of said valve housing for shutting off the hot water when the cold water is shut off.

2. The valve according to claim 1, wherein said valve housing includes an outer peripheral portion having at least one peripheral recess formed therein and includes at least one passageway formed therein and communicating with said at least one peripheral recess and said space of said valve housing.

3. A valve comprising:
a body including a chamber formed therein, and including two inlets formed therein and communicating with said chamber for receiving hot water and cold water into said chamber thereof, said body including at least one port provided therein, a valve housing received in said chamber of said body and including a channel formed therein and communicating with said inlets of said body for receiving the hot water and the cold water therefrom, said valve housing including a space formed therein and including two passages formed therein and communicating with said channel and said space of said valve housing, said valve housing including an outer peripheral portion having at least one peripheral recess formed therein and including at least one passageway formed therein and communicating with said at least one peripheral recess and said space of said valve housing, a valve means for controlling the flowing of the hot water and the cold water through said at least one port of said body, said valve means including a valve element rotatably received in said space of said valve housing and having a pad for selectively blocking said at least one passageway of said valve housing, and a safety valve means received in said channel of said valve housing for shutting off the hot water when the cold water is shut off.

4. The valve according to claim 3 further comprising means for biasing said pad to engage with said valve housing and to block said at least one passageway of said valve housing.

5. The valve according to claim 3 further comprising means for limiting a rotational movement of said valve element relative to said valve housing.

6. A valve comprising:

a body including a chamber formed therein, and including two inlets formed therein and communicating with said chamber for receiving hot water and cold water into said chamber thereof, said body including a first port and a second port provided therein, a valve housing received in said chamber of said body and including a channel formed therein and communicating with said inlets of said body for receiving the hot water and the cold water therefrom, said valve housing including a space formed therein and including two passages formed therein and communicating with said channel and said space of said valve housing, said valve housing including an outer peripheral portion having two peripheral recesses formed therein and communicating with said first and said second ports of said body, and including two passageways formed therein and communicating with said peripheral recesses and said space of said valve housing respectively, a valve means for controlling the flowing of the hot water and the cold water through either of said first port or said second port of said body, and a safety valve means received in said channel of said valve housing for shutting off the hot water when the cold water is shut off.

7. The valve according to claim 6, wherein said valve body includes a partition provided therein and having two orifices formed therein, said valve housing includes two hubs extended therefrom and engaged into said orifices of said valve body and communicating with said passages of said valve housing.

8. The valve according to claim 6, wherein said valve means includes a valve element rotatably received in said space of said valve housing and having a pad for selectively blocking either of said passageways of said valve housing.

9. The valve according to claim 8 further comprising means for biasing said pad to engage with said valve housing and to block either of said passageways of said valve housing.

10. The valve according to claim 8 further comprising means for limiting a rotational movement of said valve element relative to said valve housing.

* * * * *